(12) United States Patent
Albright et al.

(10) Patent No.: US 6,209,039 B1
(45) Date of Patent: Mar. 27, 2001

(54) METHOD AND APPARATUS FOR PROVIDING AN INTERFACE BETWEEN A PLURALITY OF FRAME RELAY NETWORKS

(75) Inventors: Martin Albright, Dallas; William C. Chen, Richardson; Michael D. Fontenot; Todd W. Frost, both of Plano; James F. Williams, Dallas, all of TX (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/173,949

(22) Filed: Oct. 16, 1998

(51) Int. Cl.[7] .................................................. G06F 15/16
(52) U.S. Cl. ........................ 709/249; 709/208; 709/209; 709/211; 370/489; 370/248; 340/825
(58) Field of Search .................................. 709/211, 249, 709/54, 208–209; 370/219, 228, 248, 351, 489, 901; 340/825

(56) References Cited

U.S. PATENT DOCUMENTS

| | | | |
|---|---|---|---|
| 5,481,738 | * 1/1996 | Bartow et al. | 709/54 |
| 5,490,252 | * 2/1996 | Macera et al. | 709/249 |
| 5,542,047 | * 7/1996 | Armstrong | 709/211 |
| 5,737,316 | * 4/1998 | Lee | 370/248 |
| 5,905,723 | * 5/1999 | Varghese et al. | 370/351 |
| 5,982,745 | * 11/1999 | Wolff et al. | 370/219 |
| 6,021,113 | * 2/2000 | Doshi et al. | 370/228 |

* cited by examiner

*Primary Examiner*—Zarni Maung
*Assistant Examiner*—Thu Ha Nguyen

(57) ABSTRACT

A system, method, and computer program product for providing a resilient network-to-network interface (RNNI) between a first frame relay network and a second frame relay network. The RNNI comprises a plurality of data links that connect a master node in the first network to a slave node in the second network. The RNNI is initialized by operating an independent instance of a Link Integrity Verification (LIV) routine on each of the data links, returning an UP or DOWN status. One of the data links is designated as the ACTIVE data link, and the remaining data links are designated as INACTIVE. Once the RNNI is initialized, the ACTIVE data link is monitored using RNNI link management procedures including the LIV routine and a Permanent Virtual Circuit (PVC) polling routine, and the INACTIVE data links are monitored using the LIV routine.

22 Claims, 11 Drawing Sheets

Resilient Frame Relay NNI (RNNI)

Example Environment

Resilient Frame Relay NNI (RNNI)

Representative NNI with two Data Links

Representative Processor

Link Integrity Verification
(LIV) Routine Operation

LIV Information Element Processing

LIV Information Element Processing

UNI/NNI Link Management

RNNI Initialization and Monitoring

RNNI Initialization and Monitoring

METHOD AND APPARATUS FOR PROVIDING AN INTERFACE BETWEEN A PLURALITY OF FRAME RELAY NETWORKS

BACKGROUND

1. Field of the Invention

The present invention relates generally to digital communication networks. In particular, the present invention is directed toward a resilient interface that connects two frame relay communication networks.

2. Related Art

A data communications network serves to transport digital information between a number of locations. A typical data communications network consists of various physical machines called "nodes", interconnected by conduits called "links." Some of the network nodes have links to the network user's devices.

Circuit switching and frame-based switching are two fundamentally different transport technologies used to build data communication networks. Circuit switching is a technology that builds a physical data path dedicated to a set of users. An example of this is the Public Switched Telephone Network. Once a call is established, the network transmission resources associated with the path are dedicated to the call, whether they are used or not. Frame-based switching is a general term for technologies based on the concept of shared network transmission resources. User data is divided into various data units called frames, packets, datagrams, or cells, depending on the specific technology employed. The data unit contains routing or connection information, used by nodes along the path to route or switch the data unit to the link connected to the next node on the way to the eventual destination. As a result, data units destined for different termination points typically share physical links between intermediate nodes in the path. Transmission resources associated with these links are more fully utilized because the statistical distribution of periods of activity and inactivity of many users results in less overall inactivity of the shared resources.

The connections between users of the Frame Relay network are called Virtual Circuits because they are logical constructs of the network, and not dedicated physical circuits. Virtual circuits can be categorized as permanent or switched. A Permanent Virtual Circuit (PVC) is a relatively long-duration logical path between two Customer Premises Equipment (CPE) devices, configured by the network administration, and is typically not dismantled after a specific communications session. A Switched Virtual Circuit (SVC) is a relatively short-duration logical connection set up in response to a call made by the CPE, and is typically disconnected after a specific communications session.

Frame Relay (FR) is technically a data network access standard defined by Frame Relay Forum Implementation Agreements and ITU-T recommendation I.122. It defines a User-to-Network Interface (UNI), a framing protocol for the link connecting Customer Premises Equipment to the Frame Relay network. The frames typically have a 3-byte header, 3-byte trailer, and a variable payload of up to 4096 bytes in length. The header includes a 1-byte start flag, and an address field containing a Data Link Connection Identifier (DLCI) that identifies unique virtual circuits on the UNI. The frame relay trailer consists of a two-byte frame check sequence field, and a 1-byte end flag field. A Network-to-Network Interface (NNI), a minor variation of the UNI specification, is also specified for connections between separate Frame Relay networks.

The frame-based transport technology employed in the interior of the frame relay network is not visible to the user, and is typically proprietary to the providers of specific frame relay switching equipment. The links on the interior of the frame relay network are referred to as trunks to differentiate them from UNIs and NNIs. Whereas UNIs are standardized access links between CPE and a frame relay network, Network-to-Network Interfaces (NNIs) provide a standardized method of inter-connecting autonomous frame relay networks which use incompatible interior trunking protocols. This inter-network transparency is increasingly important, as de-regulation of the telecommunications industry results in merged and partnered companies with merged and partnered frame relay networks.

A key advantage of Frame Relay networks is that the data units can be dynamically routed around specific points of congestion or failure within the network. This self-healing property is compromised when an NNI link connects two Frame Relay networks, because the NNI constitutes a single point of failure. This means that while the individual networks can route virtual circuits around failures of interior trunk links, a failure of an NNI link is disruptive until the failure is detected, diagnosed, and repaired. It would be highly preferable if the virtual circuits could also be routed around the failure of an NNI link.

SUMMARY

The present invention is a resilient network-to-network interface (RNNI) between a first frame relay network and a second frame relay network. The RNNI is distinct from a conventional network-to-network interface (NNI) because the RNNI is resilient to the failure of a single physical link.

An RNNI comprises a plurality of data links that connect a master node in a first network to a slave node in a second network. The master and slave nodes initialize the RNNI by operating an independent instance of a Link Integrity Verification (LIV) routine on each of the data links. The LIV routine returns the operational status of the link as UP or DOWN. The master node designates one of the data links with an UP status as the ACTIVE link. The remaining data links are designated as INACTIVE. The master node then sends an initial Permanent Virtual Circuit (PVC) poll status message to the slave node over the ACTIVE link. The slave node recognizes the ACTIVE link by the receipt of the PVC poll status message.

After this initialization process, the master and slave nodes run conventional NNI procedures on the ACTIVE link, including an LIV routine and a PVC polling routine, and monitor the INACTIVE data links using an LIV routine. If the ACTIVE link fails, the conventional NNI procedures will report a DOWN status to both nodes, and the RNNI is re-initialized.

In one embodiment, the LIV routine comprises the Annex A Link Integrity Verification poll, part of ITU-T Recommendation Q.933. In an alternate embodiment, the LIV routine comprises the Annex D Link Integrity Verification poll, part of ANSI Standard T1.617.

An advantage of the present invention is that the RNNI uses multiple data links to connect the frame relay networks. This eliminates the single point of failure associated with conventional frame relay NNIs, and fully enables the self-healing capability inherent in frame relay networks.

A second advantage is that the ACTIVE data link and the INACTIVE data links are continuously monitored with a version of the LIV routine even though only the ACTIVE data link carries user data across the NNI. In one embodiment, if one or more of the INACTIVE data links returns a DOWN status, an alarm is issued so that network administration can dispatch personnel to diagnose and restore the link to operational UP status. Thus, the INACTIVE data links are maintained in a state of readiness in case the current ACTIVE data link goes DOWN.

A third advantage is that the LIV routine for the INACTIVE link can be implemented by modifying existing frame relay standards, namely Annex A of ITU-T Recommendation Q.933 or Annex D of ANSI Standard T1.617.

Further features and advantages of the present invention, as well as the structure and operation of the various embodiments of the present invention, are described in detail below with reference to the accompanying Figures.

BRIEF DESCRIPTION OF THE DRAWINGS

The accompanying Figures, which are incorporated herein and form part of the specification, illustrate the present invention and, together with the description, further serve to explain the principles of the invention and to enable a person skilled in the pertinent art to make and use the invention.

The present invention is described with reference to the accompanying Figures. The following convention is generally followed in assigning reference numbers in the Figures. Like reference numbers often indicate identical or functionally similar elements. Additionally, the left-most digit(s) of a reference number often identifies the Figure in which the reference number first appears, except for data links (1–n) which are numbers as such for convenience.

DETAILED DESCRIPTION

The present invention is a resilient network-to-network interface (RNNI) between a first frame relay network and a second frame relay network. The RNNI comprises of a plurality of data links that connect the first and second frame relay networks.

In one embodiment, the RNNI is initialized by operating independent instances of a Link Integrity Verification (LIV) routine on each of the data links. The first data link to receive an UP status from the LIV instances is designated as the ACTIVE data link, and the remaining data links are designated as INACTIVE. Conventional NNI procedures are run on the ACTIVE link, once it is designated, including a Link Integrity Verification routine and a Permanent Virtual Circuit (PVC) polling routine.

In an alternate embodiment, an arbitrary link is assumed to have an UP status and is selected to be ACTIVE. Conventional NNI procedures are run on the ACTIVE link including a Link Integrity Verification routine and a Permanent Virtual Circuit (PVC) polling routine. The LIV routine will either return an UP status, confirming the original assumption, or a DOWN status, in which case another link is selected to be ACTIVE. This process continues, until the LIV routine on the ACTIVE link returns an UP status.

The INACTIVE data links are monitored with a Link Integrity Verification (LIV) routine. If any of the INACTIVE data links return a DOWN status, an alarm is generated, so that a network administrator may be notified to restore the failed link. In one embodiment, the LIV routine is a modification of Annex A or Annex D, where Annex A and Annex D are existing frame relay standards.

The term "frame relay network" as used herein refers to any arbitrary data communications network supporting a frame relay (FR) access standard or protocol for transferring FR frames to and from the users of the network. The FR access standard can include but is not limited to, ITU-T Recommendation 1.122, and the Frame Relay Forum Implementation Agreements.

Before describing the present invention in further detail, it is helpful to describe an example environment in which the invention can be implemented. It is not intended that the invention be limited to the example environment. In fact, after reading the following description, it will become apparent to a person skilled in the relevant art how to implement the invention in alternative environments.

Figure 1:
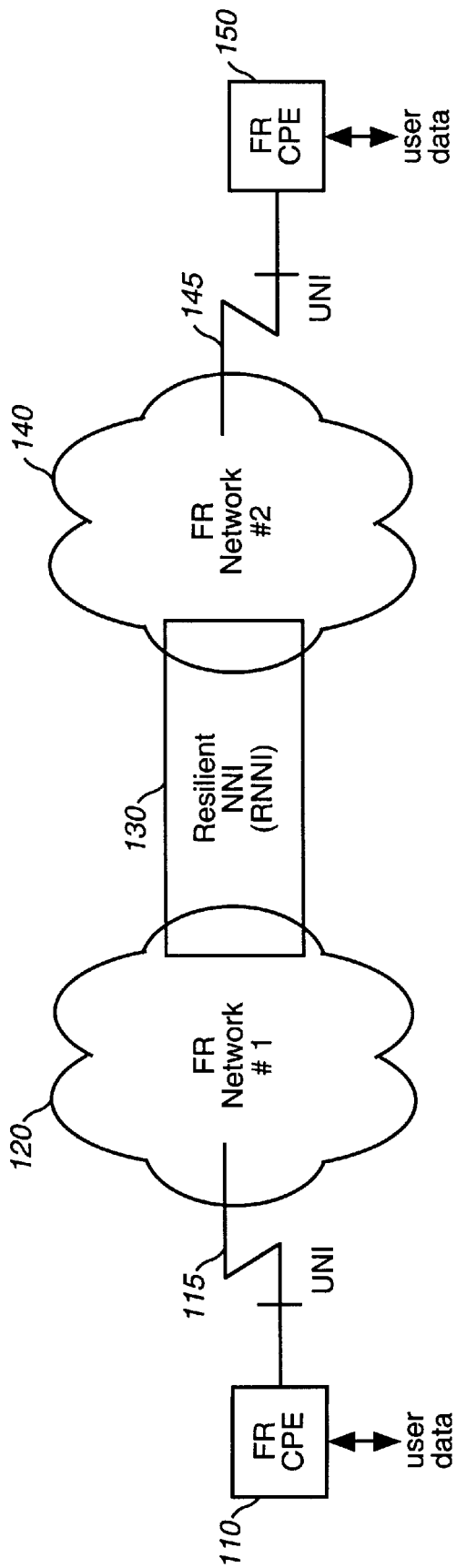
FIG. 1 is a diagram that illustrates an example environment for the present invention.

One such environment is shown in FIG. 1, which illustrates a frame relay network 120 connected to a frame relay network 140 by a resilient network-to-network interface (RNNI) 130. Frame Relay (FR) is technically an access standard defined by ITU-T recommendation I.122 and Frame Relay Implementation Agreements defined by the Frame Relay Forum. The interior transport technology used by the different FR network equipment providers invariably has some proprietary aspect, but user access to any FR network is standardized.

In FIG. 1, Customer Premises Equipment (CPE) 110 is connected to FR network 120 through User-to-Network Interface (UNI) 115. CPE 110 encapsulates user data into FR frames with the appropriate Data Link Connection Identifier (DLCI) to identify the intended virtual circuit, and sends them to FR network 120 over UNI 115. Similarly, CPE 150 is connected to FR network 140 through User-to-Network Interface (UNI) 145. Data sent by CPE 110 to CPE 150 traverses RNNI 130.

Figure 2:
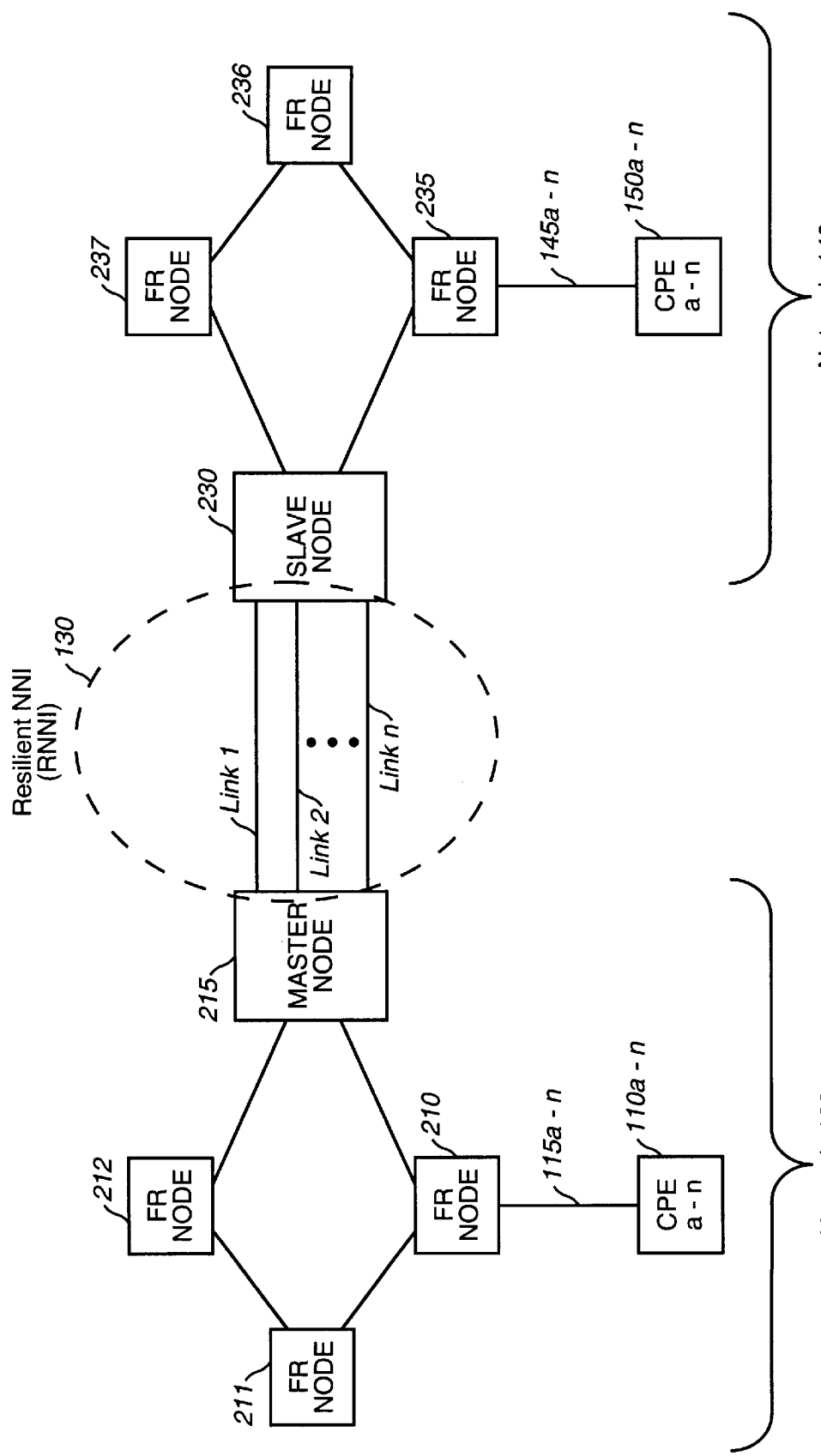
FIG. 2 is a diagram that illustrates a Resilient Network-to-Network Interface (RNNI) connecting two frame relay networks according to the present invention.

FIG. 2 is a more detailed description of the environment. FR network 120 comprises nodes 210–212 and master node 215. FR network 140 comprises nodes 235–237 and slave node 230. RNNI 130 comprises multiple data links (1–n). Each FR node 210–212 is capable of serving multiple CPE devices 110a–n connected by UNIs 115a–n. Similarly, each node 235–237 is capable of serving multiple CPE devices 150a–n connected by UNIs 145a–n. Those skilled in the art will recognize that networks 120 and 140 may be comprised of any number of FR nodes and is not limited to the number of nodes shown in FIG. 2.

A typical data transmission from CPE device 115 to CPE device 150 is described as follows. Data transmission in the reverse direction is identical except that the roles of sender and receiver are reversed. Representative CPE 110 converts user data to FR frames encoded with the DLCI identifying the intended virtual circuit on UNI 115, and sends the FR frames to node 210. FR node 210 sends the data to the next node in the network toward the destination of the virtual circuit, using the underlying technology particular to network 120. The destination of the virtual circuit could be a CPE device attached to network 120. In this example, the eventual destination is CPE device 150 attached to network 140.

In this case the virtual circuit consists of two PVC segments; one in network 120 from CPE device 110 to RNNI 130, and another in network 140 from the other side of RNNI 130 to CPE device 150. The PVC segment in network 120 is uniquely identified within network 120 by UNI 115 and a DCLI unique to UNI 115, and by RNNI 130 and a DLCI unique to RNNI 130. The PVC segment in network 140 is uniquely identified within network 140 by RNNI 130 and a DLCI unique to RNNI 130, and by UNI 145 and a DLCI unique to UNI 145. In order for the two PVC segments to be connected together, they are assigned the same DLCI on RNNI 130.

Network 120 routes the user data to Master node 215, which formats the data into FR frames, and sends them over the ACTIVE data link of RNNI 130 to slave node 230. Only one of data links (1–n) will be ACTIVE at any one time. Slave node 230 converts received FR frames to the transport format specific to network 140, which may or may not be the same as that used in network 120, and routes the data according to the received DLCI. In this example, the destination node for the virtual circuit in network 140 is node 235, which formats the data back into FR frames with the DLCI identifying the virtual circuit, and transmits the data to CPE device 150.

One advantage of the present invention is that RNNI 130 comprises multiple data links (1–n). This eliminates the single point of failure associated with conventional FR NNIs. As stated above, only one of data links (1–n) will be ACTIVE at any given time. The other data links will be INACTIVE, but are continuously monitored to insure that they maintain readiness in case there is a failure on the ACTIVE link. Initializing and monitoring data links (1–n) will be described in the sections that follow.

Figure 3:
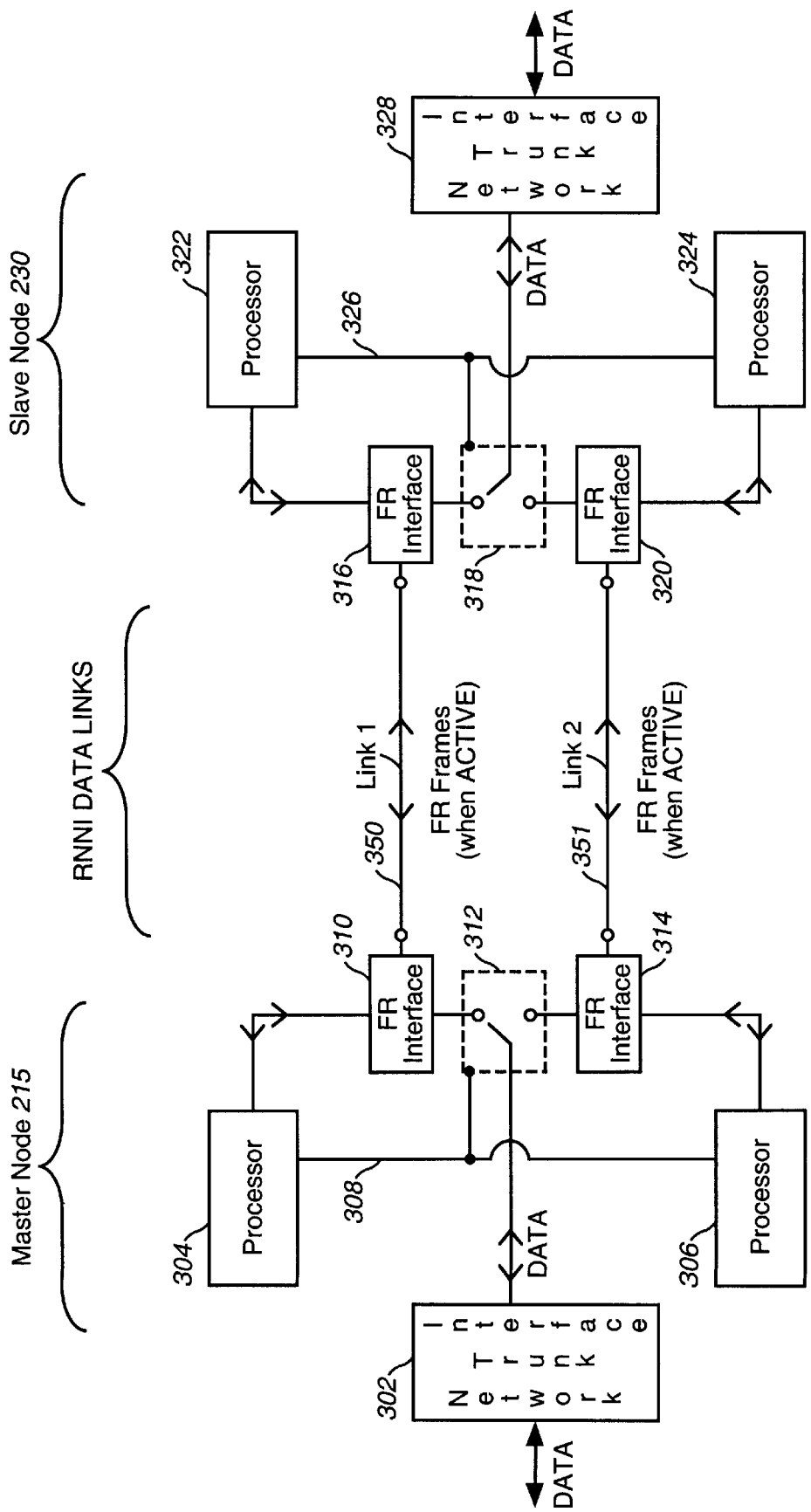
FIG. 3 is a block diagram that illustrates the components in a representative frame relay RNNI.

FIG. 3 illustrates a block diagram of the RNNI 130 environment, master node 215, slave node 230, and RNNI component data links 1 and 2. Master node 215 components include: network trunk interface 302, processors 304 and 306, communication channel 308, switch 312, and FR interfaces 310 and 314. Slave node 230 components include FR interfaces 316 and 320, switch 318, processors 322 and 324, communication channel 326, and network interface 328. FIG. 3 illustrates only two data links (link 1 and link 2) for convenience of discussion. Those skilled in art will recognize how to scale the present invention to any number of data links (1–n) based on the description that follows.

Network trunk interface 302 acts as the interface between node 215 and a trunk link to another node in network 120. As such, network trunk interface 302 receives data from the rest of network 215 destined for NNI 130. Those skilled in the art will recognize that node 215 may have more than one network trunk interface linking node 215 to the rest of network 120. Likewise, network interface 328 provides similar functionality for node 230.

Figure 4:
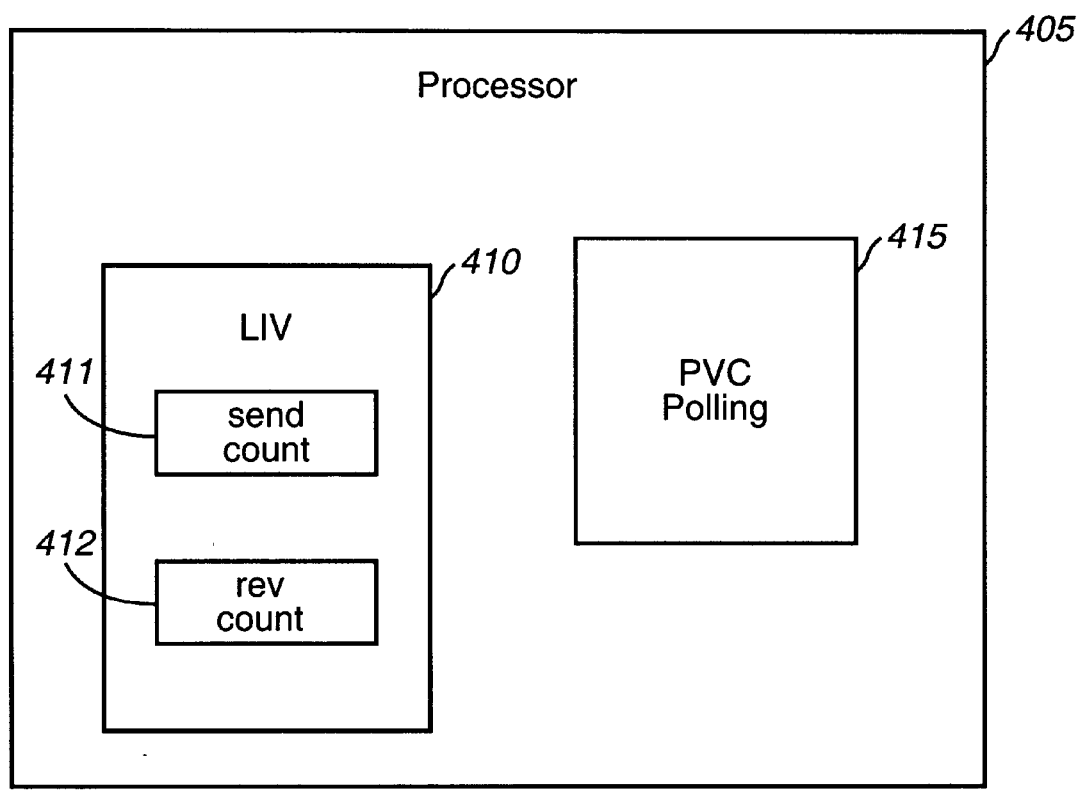
FIG. 4 is a block diagram of a representative processor in the RNNI.

The processors 304, 322, 306, and 324 control each end of the two links 350 and 351. The processor functions relating to the RNNI are shown in FIG. 4. Processor 405 operates Link Integrity Verification (LIV) routine 410, and Permanent Virtual Circuit (PVC) polling routine 415. LIV routine 410 includes a send counter 411.

Initially, both links are in the default RNNI INACTIVE state, and in the default LIV DOWN state. Master processor 304 and slave processor 322 each run LIV routine 410 to determine whether the operational status of link 1 is UP or DOWN. Simultaneously, master processor 306 and slave processor 324 each run LIV routine 410 to determine the operational status of data link 2. Master node processors 304 and 306 communicate with each other on channel 308 to reach agreement on which of the two links to designate as the ACTIVE link. In one embodiment, the first link to return an UP status in response to the LIV routine is designated ACTIVE. In an alternate embodiment, processors 304 and 306 pick an arbitrary link and declare it ACTIVE unless or until the LIV routine on that link returns a DOWN status. Only one link is designated ACTIVE, and all others composing the RNNI maintain their default INACTIVE designations.

Once a data link is designated as ACTIVE, the Master node ACTIVE link processor initiates conventional bi-directional NNI link management by operating, in addition to the LIV routine, PVC polling routine 415, which sends a PVC poll message to the Slave side of the ACTIVE link. The Slave node processor associated with the ACTIVE link recognizes the PVC polling message as the signal that the link has been designated ACTIVE by the Master node and initiates PVC polling routine 415 to respond to the poll from the master. At this time, LIV and PVC polling routines run by both Master and Slave processors associated with the ACTIVE link constitute conventional bidirectional NNI link management for the ACTIVE link. The INACTIVE data link continues to be monitored by the associated Master and Slave processors running LIV routine 410, assuring readiness of the backup INACTIVE link if the ACTIVE data link goes DOWN.

An advantage of the present invention is the use of a separate set of processors for each data link. This assures that the failure of a single processor at either the master node or the slave node will not cause the entire RNNI to fail. In an alternate, but less preferable embodiment, the master and slave nodes each have a single processor at each node for initializing and monitoring both data links 350 and 351. Using a single processor provides resiliency to link failure, but not to processor failure. Those skilled in the art will recognize that a single processor can operate separate routines for each data link, where the failure of one subroutine can be insulated from the subroutine monitoring the other link.

Once an RNNI data link has been designated ACTIVE, the node processors connect the virtual circuits to the ACTIVE link. In this simplified example, Master node 215 is shown with a single network trunk interface 302, and a logical switch 312 connecting it to either Frame Relay interface 310 terminating link 350, or Frame Relay interface 314 terminating link 351. Similarly, Slave node 230 is shown with a single network trunk interface 328, and a logical switch 318 connecting it to either Frame Relay interface 316 terminating link 350, or Frame Relay interface 318 terminating link 351. The Master node operates logical switch 312 by means of channel 308 and the Slave node operates logical switch 318 by means of channel 326. This simplification serves to illustrate the basic principle of the invention, but those skilled in the art will recognize that a node may have any number of trunk and Frame Relay interfaces and that any or all of these interfaces may serve virtual circuits terminating on the RNNI. In this case the switching mechanism is considerably more complex.

Master node Frame Relay interfaces 310 and 314 terminate data links 350 and 351 respectively. The Master node converts the data format from the transport protocol used by network 120 trunks into FR frames for the RNNI, and vice versa. Likewise, Slave node Frame Relay interfaces 316 and 320 terminate data links 350 and 351, respectively. The Slave node converts the data format from the transport protocol used by network 140 trunks into FR frames for the RNNI, and vice versa. As discussed above, network 120 and network 140 may use different internal trunk protocols, but are both considered FR networks by virtue of their acceptance and use of the common Frame Relay access protocol at the UNIs, NNIs, and RNNIs.

Frame Relay interfaces 310 and 316 are controlled by processors 304 and 322, receiving, to send and receive LIV and PVC polling information elements to manage data link 350. Likewise, FR interfaces 314 and 320 are controlled by processors 306 and 324, receiving, to send and receive LIV and PVC information elements to manage data link 351. Data link initialization and monitoring using LIV and PVC information elements will be discussed in more detail in the following sections.

Frame Relay can be described as a link layer protocol, which is the second layer in the Open Systems Interconnect (OSI) model and is supported by an underlying physical layer. The present invention puts no restrictions on the physical layer that supports data links 350 and 351 other than the ability to support the FR data link layer.

In one embodiment, the physical layer (first layer of the OSI model) that supports data links 350 and 351 is one of the metallic cable technologies, such as twin lead copper or coaxial cable operating an appropriate physical layer protocol. Appropriate physical layer standards include but are not limited to the following: High Speed Serial Interface (HSSI) protocol, RS-232, DS1, DS3, V.35, or other appropriate physical layer protocols.

In a second embodiment, the physical layer that supports data links 350 and 351 is optical fiber operating an appropriate optical link protocol, including but not limited to SONET.

In a third embodiment, the physical layer supporting data links 350 and 351 is wireless technology, operating an appropriate wireless protocol.

In a fourth embodiment, each link could be implemented using a different physical layer standard.

Those skilled in the art will recognize that there are multiple types of physical links operating multiple physical layer protocols that could be used to practice the present invention.

LIV Procedure

Figure 5:
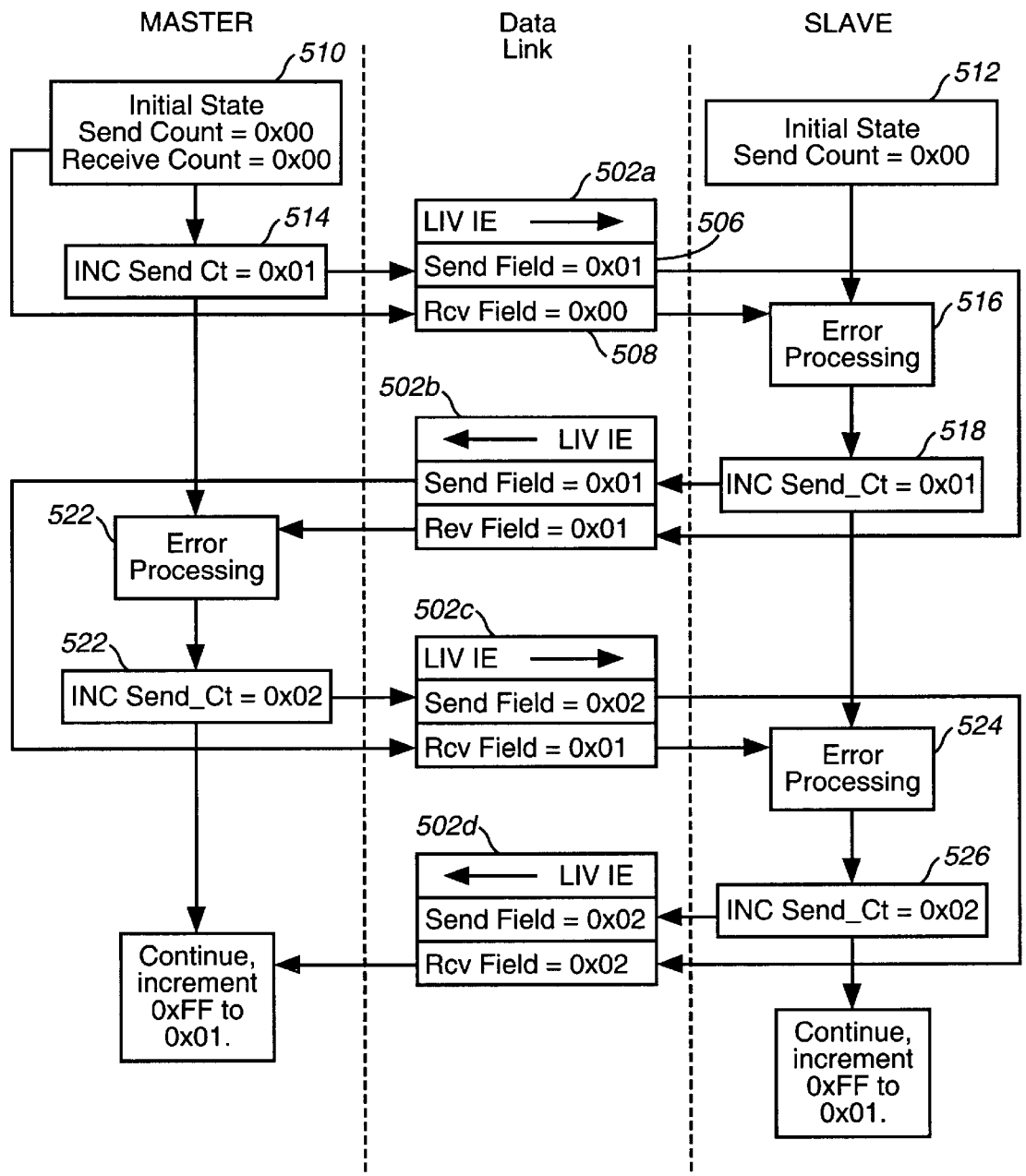
FIG. 5 is a diagram depicting the operation of a Link Integrity Verification (LIV) routine used to test the status of the data links.

FIG. 5 is a flowchart illustration of one embodiment of the Link Integrity Verification (LIV) routine 410 used to determine the operational status of data links (1–n). As seen in FIG. 5, LIV routine 410 run by both processors on each end of a link results in multiple information elements (IE) 502a–n sent continuously, at a user configured time interval, between the master and slave nodes 215 and 230 over the data link under test. Each IE 502 is carried in the FR frame with a DLCI identifying the Link Management channel to differentiate it from virtual circuits carrying user data between networks 120 and 140.

An explanation of an example implementation of an LIV routine 410 follows. It is not meant to limit the invention in any way. Those skilled the art will recognize that other useful implementations for LIV routine 410 can be devised.

The processors on each end of the link run the LIV routine, and keep local instances of Send Count 411. Referring to FIG. 5, each IE 502 comprises an 8-bit Send Field 506, and an 8-bit Receive Field (Rcv Field) 508.

In step 510, Master node 215 initializes Send Count 411 and Receive Count (Rcv Count) 412 to zero. Likewise in step 512, Slave node 230 initializes Send Count 411 to zero.

In step 514, Master node 215 increments Send Count 411 to 1 and generates a first information element 502a with Send Field=1 and Rcv Field=0, and sends it across the data link under test to Slave node 230.

In step 516, Slave node 230 processes Rcv Field 508 of information element 502a to determine if the value is the same as the current value of Send Count 411. One embodiment of generating and processing information elements 502 is presented in FIGS. 6A and 6B.

In step 518, Slave node 230 increments Send Count 411 and sends information element 502b to Master node 215 with Send Field=Send Count 411=1. The Slave node 230 also copies the value of 1 from Send Field 506 in the last information element received from Master node 215 into Rcv Field 508 of information element 502b, looping the value back to the Master node 215. It is this loop-back that is the basis of the Link Integrity test. If the link is operational, the value sent will return uncorrupted. This same loop-back function is performed for the Slave node 230 by the Master node 215.

In step 520, Master node 215 processes Rcv Field 508 of information element 502b to determine if the value is the same as the current value of Master Send Count 411, verifying the integrity of the link.

In step 522, Master node 215 increments Send Count 411, and sends information element 502c to Slave node 230 with Send Field=Send Count 411=2. The Master node 215 also loops back the value of 1 from Send Field 506 in the last information element received from Slave node 230, into Rcv Field 508 of information element 502c.

In step 524, Slave node 230 processes Rcv Field 508 of information element 502c to determine if it is the same as the current value of Send Count 411, verifying link integrity.

In step 526, Slave node 230 increments Send Count 411, and sends information element 502d to Master node 215 with Send Field=Send Count 411=2. The Slave node also copies the value of 2 from Send Field 506 in the last information element received from Master node 215 into Rcv Field 508 of information element 502d, looping the value back to the Master node.

This back and forth process continues as long as the link is operational. In one embodiment, when the maximum 8-bit value of 0xFF is reached by either Send Counter, it is rolled over to 1, bypassing 0, providing a means by which the other end can detect re-initialization of the LIV routine, the only time the value 0 is used.

The above discussion relating to FIG. 5 is meant as an overview of one design for LIV routine 410, and is not meant to limit the invention in any way. Specifically, information elements 502a–n in FIG. 5 are illustrated to have 8-bit binary Send and Rcv Fields 506 and 508 respectively. Those skilled in the art will recognize that the fields can each be any n-bit binary value. Furthermore, those skilled in art will recognize that the counts could be initialized to values other than zero, or sequenced differently.

Figure 6A:
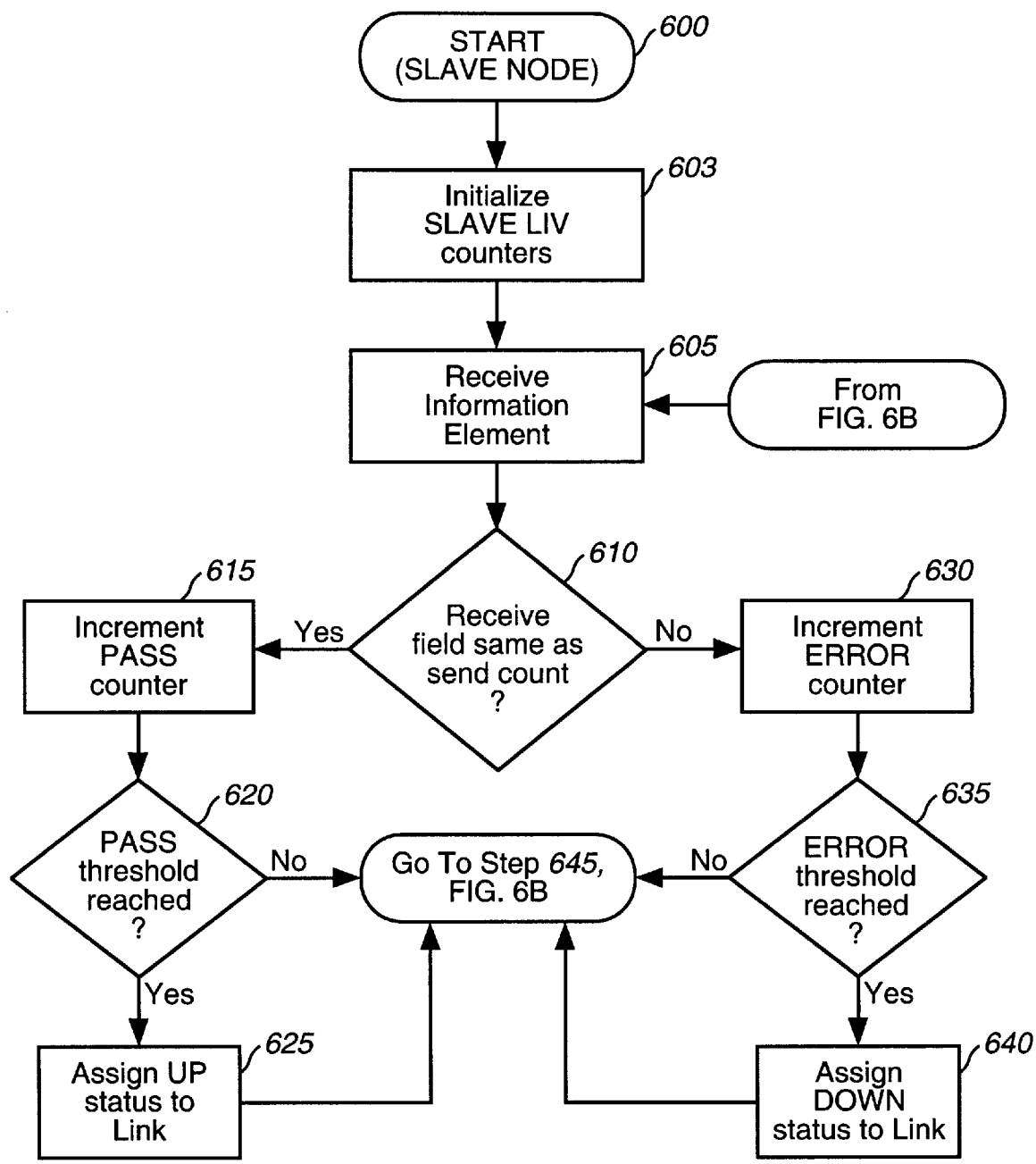
FIGS. 6A and 6B are a flowchart that illustrates the steps taken by the LIV routine to process a received LIV information element and generate an LIV information element for transmission.
Figure 6B:
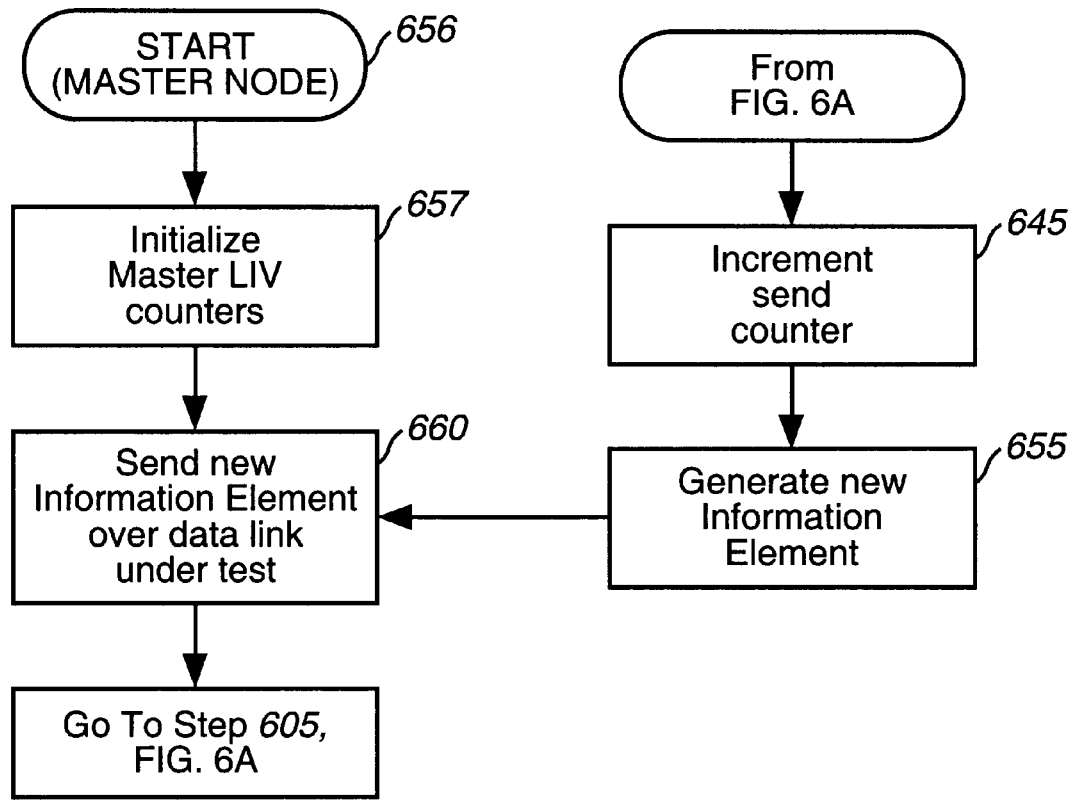

FIGS. 6A and 6B constitute a flowchart of a representative LIV routine 410, separated into send and receive sub-processes. FIG. 6A illustrates the receive process referenced in blocks 516, 520, and 524 of FIG. 5. FIG. 6B illustrates the send process referenced in blocks 514, 518, 522, and 526 of FIG. 5. Both Master and Slave nodes run the same LIV process, but the entry points shown in FIGS. 6A and 6B are different, due to the fact that the Master node 215 starts the process by sending a message, and the Slave node 230 starts the process by receiving a message.

In step 605, an information element 502 is received, comprising Send Field 506 and Receive Field 508. This is where the Slave node 230 starts the LIV process after initiating the routine and setting its Send Count 411 to Zero in steps 600 and 603.

In step 610, LIV routine 410 compares the value in Rcv Field 506 of the received information element, with Send Counter 411. If they are identical, received information element 502 has successfully traversed the data link under test, and control flows to step 615. If they are different, an error was introduced and detected, and control flows to step 630.

In step 615, LIV routine 410 increments a PASS counter logging the successful outcome of the link test. In step 620, LIV routine 410 compares the PASS counter value with a configured threshold value. If the PASS counter value is greater than or equal to the threshold, control passes to step 625, where the status of the link is designated as UP. Control then flows to step 645 for the transmission of the LIV information element to the other side. If the PASS counter value is less than the threshold value, control flows directly to step 645, without altering the status of the link.

UP status signifies that the data link has passed the link test a sufficient number of times to be considered reliable for user data. The PASS threshold is the number of consecutive times that the FR interface has sent an arbitrary incrementing 8-bit value to the other side of the link, and received it back without error. The PASS threshold number is chosen by the designer of RNNI 130, or made available as a user configurable parameter.

In step 630, LIV routine 410 increments an ERROR counter, logging the failure of the link test. An error is also logged if the expected message is not received at all. In step 635, LIV routine 410 compares the ERROR counter value with a configured threshold value. If the ERROR counter value is greater than or equal to the threshold value, control passes to step 640 where the status of the link is designated as DOWN. Control then flows to step 645 for the transmission of the LIV information element to the other side. If the ERROR counter value is less than the threshold value, control flows directly to step 645, without altering the status of the link.

DOWN status signifies that the data link under test has failed the LIV link test a sufficient number of times to be considered unreliable for use. The ERROR threshold is the number of consecutive times that the FR interface has sent an arbitrary incrementing 8-bit value to the other side of the link, and failed to receive it back without error. The ERROR threshold number is chosen by the designer of RNNI 130, or made available as a user configurable parameter.

In step 645, LIV routine 410 increments Send Count 411, which was initialized to zero in step 657 by the Master node 215, and in step 603 for the Slave node 230.

In step 655, LIV routine 410 generates a new outgoing information element 502. The current value of Send Counter 411 is copied into Send Field 506. The value of Receive Field 508 is a copy of the value of Send Field 506 of the last received LIV information element.

In step 660, the new information element 502 is sent over the data link under test. This is the point at which the Master node 215 starts the LIV process, after initiating the routine and initializing the Send Counter in steps 656 and 657 respectively. Control then flows to step 605 to receive the next LIV information element 502 from the other side of the link.

The pass or fail criteria for the link test can be summarized as follows. Each of the two FR interfaces terminating the link sends an 8-bit value to the other side of the link in Send Field 506 of an LIV information element 502. The opposite FR interface loops the value back by copying the value of Send Field 506 in the received IE into Rcv Field 508 of the IE it sends in response. The first FR interface can then test to verify that the two crossings of the link and the processing by the other side occurred without error, by comparing what it sent with what it received. The process is repeated indefinitely with 8-bit count values that vary through a lengthy sequence. Each side runs the same routine, transmitting, receiving, and testing its own data, and simultaneously looping test data back for the other side. This is illustrated in FIG. 5 where information element 502c, received by slave node 230, has a Receive Field value of 1, equal to Send Field value 1 of information element 502b sent by Slave node 230. Likewise, information element 502b received by Master node 215, has a Receive Field value of 1, equal to Send Field value 1 of information element 502a sent by Master node 215.

The LIV routine 410 illustrated in FIGS. 5, 6A, and 6B and described in the related discussion is but one embodiment for determining the status of a data link (1–n). Those skilled in art will recognize equivalents, extensions, variations, deviations, etc. of LIV routine 410 that could be used to determine the status of data links (1–n) based on the discussion given herein. Such equivalents, extensions, variations, deviations, etc. are within the scope and spirit of the present invention.

NNI Link Management Process

Figure 7:
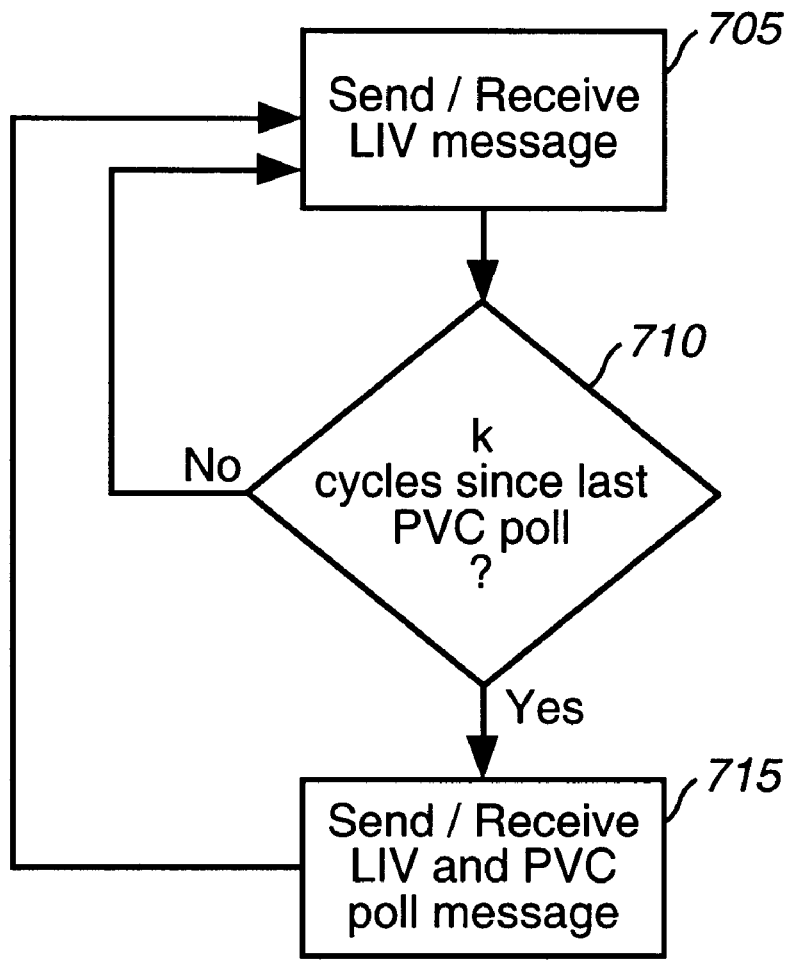
FIG. 7 is a flowchart that illustrates a link management process utilizing LIV and PVC polling routines.

FIG. 7 illustrates a flowchart of a conventional UNI and NNI link management process consisting of an LIV routine 410 and a Permanent Virtual Circuit (PVC) polling routine 415. LIV information elements and PVC polling information elements are part of a larger NNI Link Management message structure encapsulated in a Frame Relay frame with a unique Link Management DLCI. The link management message can include only the LIV information element, or both the LIV and PVC Polling information elements.

In step 705, the FR NNI interface processor 405 includes only the LIV routine 410 in the link management message.

In step 710, processor 405 determines whether a specific number k of link management message cycles have passed since the last PVC poll had been conducted. If so, control passes to block 715, and a PVC poll is included in the next Link Management message. If not, control passes to block 705 where the next Link Management message is sent with only the LIV information element. In one embodiment, k equals 6 cycles, meaning that every sixth Link Management message cycle will contain a PVC poll.

In step 715, PVC status is polled. Master node 215 sends a PVC status poll information element to Slave node 230. In the poll response, Slave node 230 returns the DLCIs of operational PVCs on network 140. In an NNI, the PVC status polling is bidirectional, meaning that Slave node 230 also polls Master node 215 for the status of active PVCs in network 120. PVC status is polled every k Link Management message cycles by both sides.

PVC polling routine 415 is operated only on the ACTIVE link. The initiation of bidirectional PVC polling by the Master node 215 is the signal to the Slave 215 that the link is ACTIVE.

An alternate embodiment of UNI and NNI Link Management Procedures is event driven, instead of polling driven. In this case, asynchronous messages are generated whenever the state of a PVC changes. In this embodiment, the asynchronous notification, by Master node 215 to Slave node 230 of PVCs active within network 120, is the signal to Slave node 230 that the link is ACTIVE. In this embodiment, step 705 runs continuously, and step 715 is not needed.

RNNI Operation

Figure 8A:
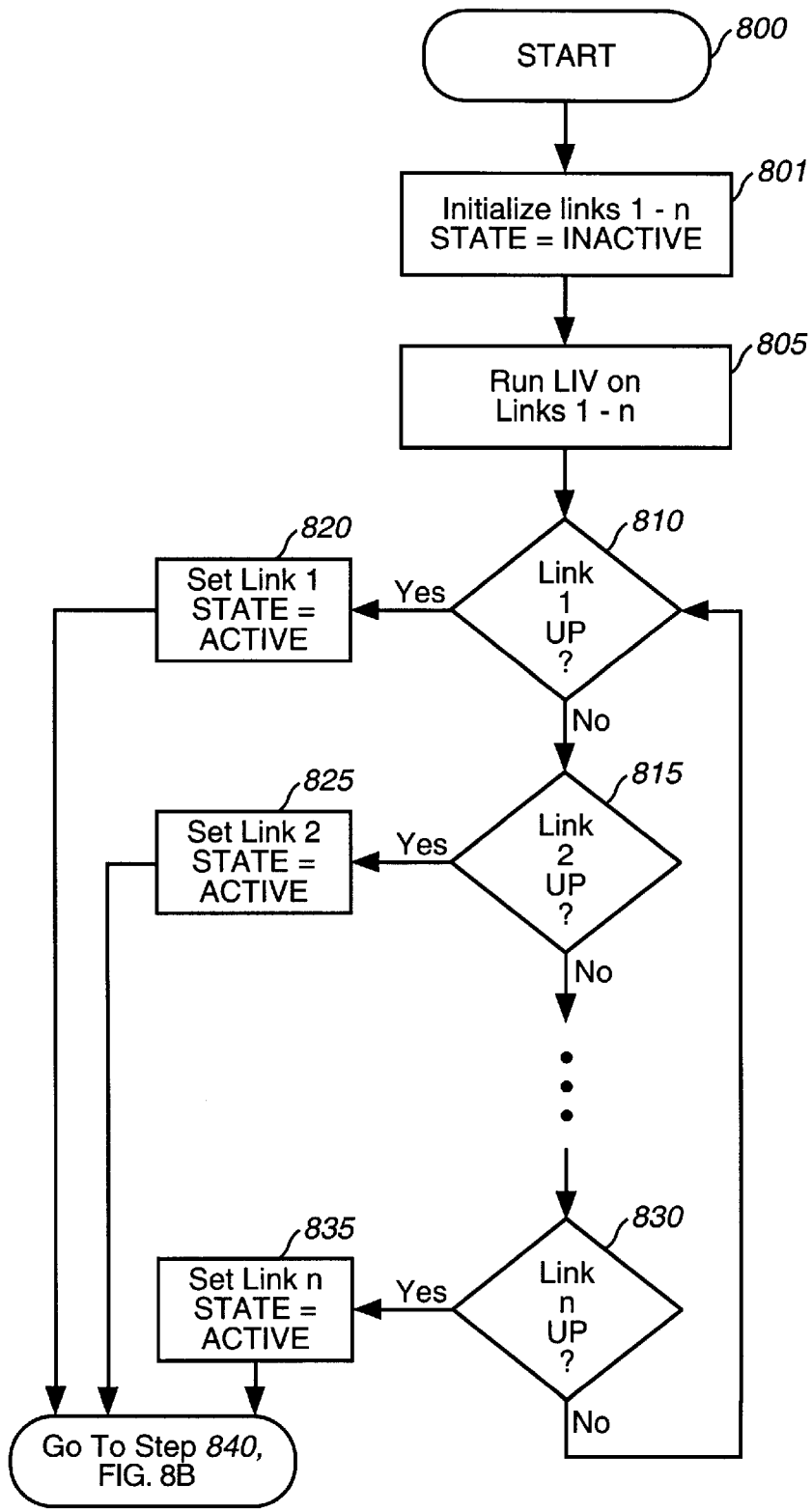
FIGS. 8A and 8B are a flowchart of RNNI initialization and monitoring according to the present invention.
Figure 8B:
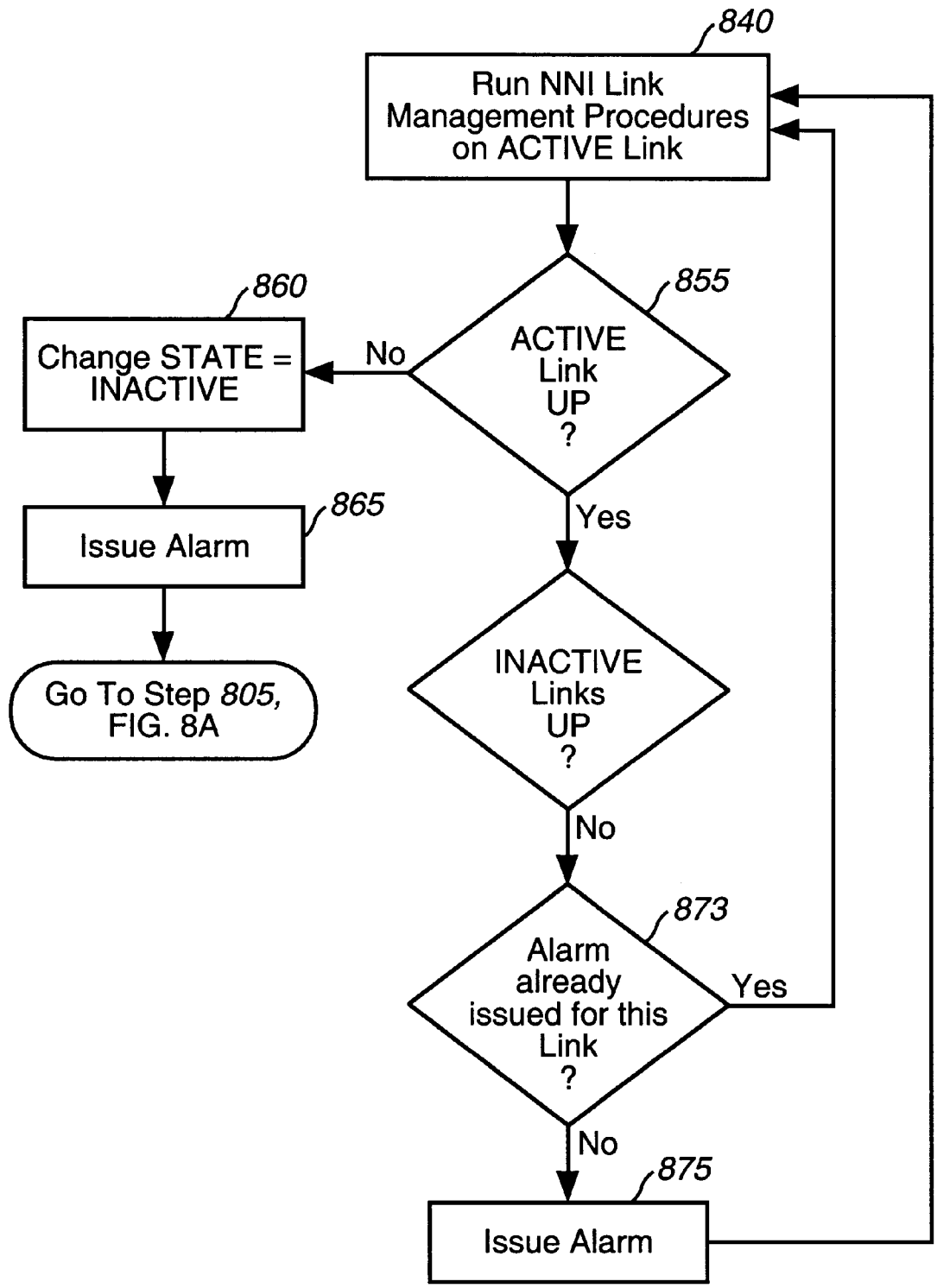

FIGS. 8A and 8B are operational flowcharts for one embodiment of the process to select one of the n links to be ACTIVE based on the outcome of LIV routines running on the links. The flowcharts depict the steps taken by Master node 215 to operate RNNI 130 according to the present invention. The entry point 800 leads to block 801 where all of the links 1 through n are initialized to the INACTIVE state.

In step 805, Master node 215 operates an independent instance of LIV routine 410 on each of the data links (1–n). In one embodiment, this is done simultaneously.

In step 810, Master node 215 determines if the LIV routine 410 for data link 1 has returned an UP status. If link 1 is UP, control flows to step 820, where Master node 215 designates data link 1 as ACTIVE, after which control flows to step 840. If link 1 is not UP, then control flows to step 815.

In step 815, Master node 215 determines if the LIV routine 410 for data link 2 has returned an UP status. If link 2 is UP, control flows to step 825, where Master node 215 designates data link 2 as ACTIVE, after which control flows to step 840. If link 2 is not UP, then control flows to step 830.

In step 830, Master node 215 determines if an UP status has been returned for data link n by LIV routine 410. If link n is UP, control flows to step 835, where Master node 215 designates data link n as ACTIVE, after which control flows to step 840. If link n is not UP, then control flows to step 810. Data links (1–n) are continuously tested with independent instances of LIV routine 410 until one of the data links returns an UP status.

In step 840, Master node 215 sends an initial PVC status poll to Slave node 230 over the ACTIVE data link. This initial PVC status poll serves to signal the designation of the data link as ACTIVE to Slave node 230. Slave node 230 responds to the PVC poll, and initiates bi-directional Link Management procedures on the ACTIVE link, including LIV and PVC polling routines as shown in FIG. 7. By this means, the Master and Slave nodes determine which PVCs are active in each other's networks, and available for user data to flow across RNNI 130.

At this point, LIV routines continue to monitor the status of the INACTIVE links, and bi-directional NNI link management procedures monitor the status of the ACTIVE link.

In step 855, Master node 215 checks the status of the ACTIVE link. If the ACTIVE link is still UP, control flows to step 870, which checks the status of the INACTIVE links. If the INACTIVE links are still UP, control returns to block 855. This loop is repeated indefinitely until one of the links goes DOWN.

If the ACTIVE link is DOWN, control flows to step 860 where Master node 215 changes the link status from ACTIVE to INACTIVE, and issues a Network Management Alarm so that network administration can take action to restore the failed link. After issuing the alarm, control flows to step 805, where another link will be selected to be the RNNI ACTIVE link.

If any of the INACTIVE links goes DOWN, Master node 215 issues a Network Management Alarm after verifying that one had not been issued previously in block 873. In response to the alarm, network administration can take action to restore the failed link. After issuing the alarm, control returns to step 855 where the process is repeated. Note that a DOWN INACTIVE link does not result in any changes to the ACTIVE link.

An advantage of the present invention is that the ACTIVE data link and INACTIVE data link(s) are continuously monitored with instances of LIV routine 410. If an INACTIVE link fails, the network administrator is notified so corrective action can be taken. This insures that each of the INACTIVE links maintains a state of readiness in case the ACTIVE link goes DOWN, so that one of the INACTIVE link(s) can be quickly designated ACTIVE in the selection process beginning with step 805.

An alternate embodiment of the ACTIVE link selection process is to assume the operational status of an arbitrary link to be UP, and enter the flow of the process illustrated in FIGS. 8A and 8B at block 840. If the link is in fact UP, the activation of the link proceeds as before. If the link is in fact DOWN, another link is assumed to be UP and the process illustrated in FIG. 8A and 8B is re-entered at block 840. This embodiment effectively uses the LIV routine embedded in the Link Management procedures of block 840 to test the operational status of the links. The links 1–n are sequentially designated ACTIVE until one of them returns an UP status by means of the LIV routine, thereby maintaining ACTIVE status.

Annex A and Annex D

A key advantage of the present invention recognized by the inventors is that LIV routine 410 can be implemented by making a small modification to an existing frame relay (FR) standard, namely Annex A of ITU-T Recommendation Q.933, which is incorporated herein by reference. Annex A is intended as a standard for initializing and monitoring the User Network Interface (UNI) between a CPE and a FR network. FIG. 1 illustrates exemplary UNIs 115 and 145.

LIV routine 410 can be implemented by operating Annex A without the periodic PVC polling. In Annex A, the number of Link Integrity Verification (LIV) cycles between PVC status polls is controlled by a variable called N391; where the N391 default is 6 cycles. As such, LIV routine 410 can be equated to the standard Annex A procedure with N391 set to an infinitely large number of polling cycles.

In an alternate embodiment, Annex D from ANSI standard T1.617 can be used instead of Annex A. Annex D is also intended as a standard for initializing and monitoring the UNI between a CPE and a FR network, and is incorporated herein by reference. Given this description, those skilled in art will realize how to implement routines 410 and 415 using Annex D based on the above discussion with respect to Annex A.

The subject invention has been described above with the aid of functional building blocks illustrating the performance of specified functions and relationships thereof. The boundaries of these functional building blocks have been defined partly for the convenience of the description. Alternate boundaries may be defined so long as the specified functions and relationships thereof are appropriately performed. Any such alternate boundaries are thus within the scope and spirit of the claimed invention. These functional building blocks may be implemented by discrete components, application specific integrated circuits, processors executing appropriate software, and the like or any combination thereof. It is well within the scope of a person with ordinary skill in the art to develop the appropriate hardware and/or software to implement these functional building blocks.

Figure 9:
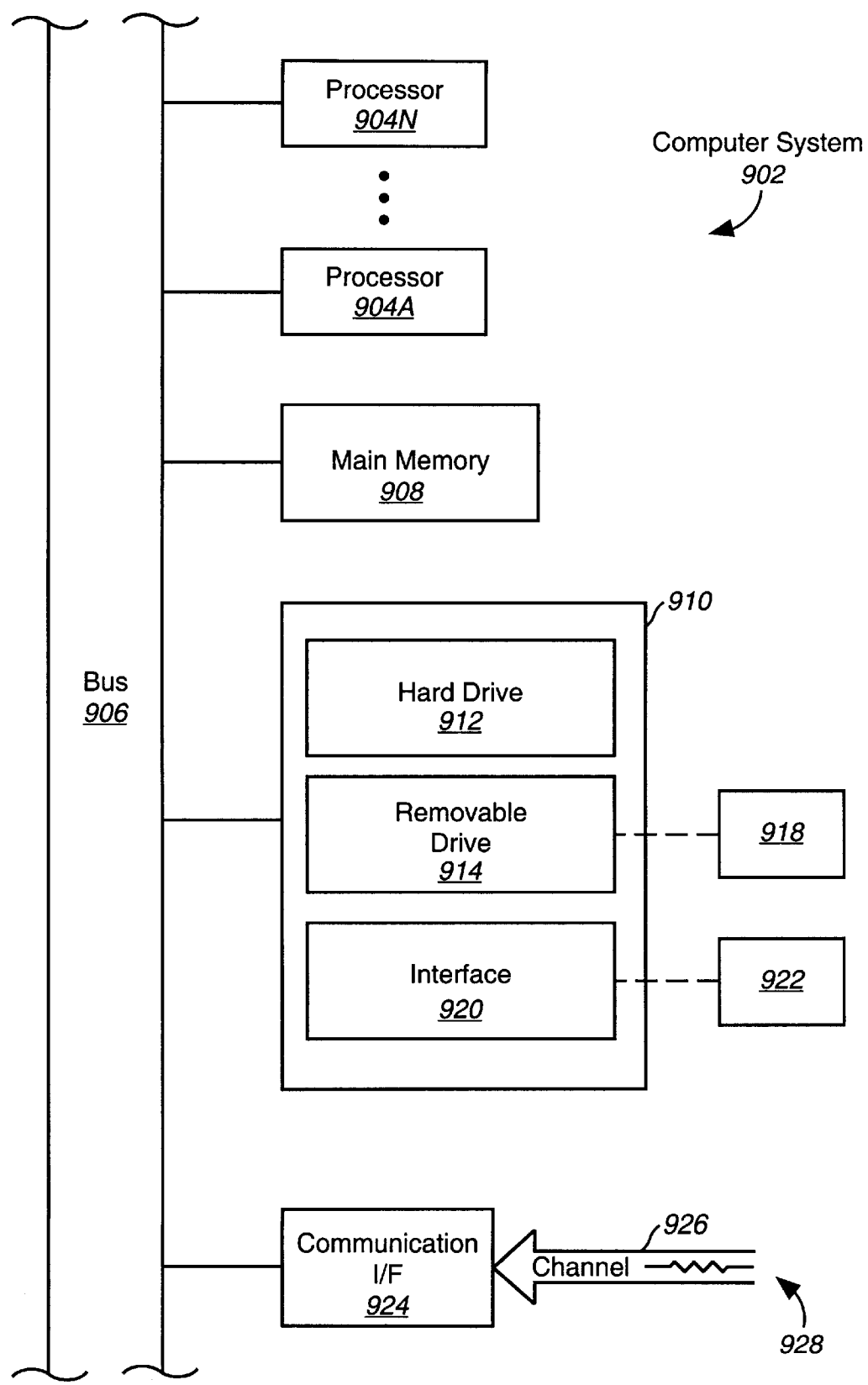
FIG. 9 is a block diagram illustrating a computer implementation of the invention.

In one embodiment, the invention is implemented as a software and/or hardware embodiment in a computer system. An example computer system 902 is shown in FIG. 9, which could be used to implement processors 304, 306, 322, 324 and 405. The computer system 902 includes one or more processors 904A–N. Processors 904A–N are connected to a communication bus 906. Various software embodiments are described in terms of this example computer system. After reading this description, it will become apparent to a person skilled in the relevant art how to implement the invention using other computer systems and/or computer architectures.

Computer system 902 also includes a main memory 908, random access memory (RAM), and can also include a secondary memory or secondary storage 910. The secondary memory 910 can include, for example, a hard disk drive 912 and a removable storage drive 914, representing a floppy disk drive, a magnetic tape drive, an optical disk drive, etc. The removable storage drive 914 reads from and/or writes to a removable storage unit 918 in a well known manner. Removable storage unit 918, represents a floppy disk, magnetic tape, optical disk, etc. which is read by and written to by removable storage drive 914. As will be appreciated, the removable storage unit 918 includes a computer usable storage medium having stored therein computer software and data.

In alternative embodiments, secondary memory 910 may include other similar means for allowing computer software and data to be loaded into computer system 902. Such means can include, for example, a removable storage unit 922 and an interface 920. Examples of this include a program cartridge and cartridge interface (such as that found in video game devices), a removable memory chip (such as an EPROM, or PROM) and associated socket, and other removable storage units 922 and interfaces 920, which allow software and data to be transferred from the removable storage unit 922 to computer system 902.

Computer system 902 can also include a communications interface 924. Communications interface 924 allows software and data to be transferred between computer system 902 and external devices. Examples of communications interface 924 can include a modem, a network interface (such as an Ethernet card), a communications port, a PCM-CIA slot and card, etc. Software and data transferred via communications interface 924 are in the form of signals 928 which can be electronic, electromagnetic, optical or other signals capable of being received by communications interface 924. These signals 928 are provided to communications interface via a channel 926. This channel 926 carries signals 928 and can be implemented using wire or cable, fiber optics, a phone line, a cellular phone link, an RF link and other communications channels.

In this document, the terms "computer program medium" and "computer usable medium" are used to generally refer to media such as removable storage device 918, a hard disk installed in hard disk drive 912, and signals 928. These computer program products are means for providing software (e.g., computer programs) to computer system 902.

Computer programs (also called computer program logic) are generally stored in main memory 908 and/or secondary memory 910 and executed therefrom. Computer programs can also be received via communications interface 924. Such computer programs, when executed, enable the computer system 902 to perform the features of the present invention as discussed herein. In particular, the computer programs, when executed, enable the processor 904 to perform the features of the present invention. Accordingly, such computer programs represent controllers of the computer system 902.

In an embodiment where the invention is implemented using software, the software may be stored in a computer program product and loaded into computer system 902 using removable storage drive 914, interface 920, hard drive 912 or communications interface 924. The computer control logic (software), when executed by the processor 904, causes the processor 904 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant arts.

In yet another embodiment, the invention is implemented using a combination of hardware, firmware, and/or software.

While various embodiments of the present invention have been described above, it should be understood that they have been presented in a way of example only, and not limitation. It will be understood by those skilled in the art that the various changes in form and details may be made therein without departing from the spirit and scope of the present invention as defined in the appended claims. Thus, the breadth and scope of the present invention should not be limited by any of the above-described exemplary embodiments, but should be defined only in accordance with the following claims and their equivalents.

What is claimed is:

1. A resilient network-to-network interface (RNNI) between a first frame relay network and a second frame relay network, wherein the first network includes a master node and the second network includes a slave node, the RNNI comprising:
   a plurality of data links between the master node and the slave node, wherein the plurality of data links comprise:
   an independent instance of a Link Integrity Verification (LIV) routine on each of the data links that determines the status of the data links;
   a detector for detecting operational status of the data links as determined by the LIV routine; and
   a designator for designating one of a plurality of constituent links of the RNNI with UP status as ACTIVE and designating the rest of the constituent links of the RNNI as INACTIVE.

2. The RNNI of claim 1 further comprising the master node sending a PVC poll status message to the slave node over the ACTIVE link, wherein the slave node recognizes the ACTIVE link on receipt of the PVC poll status message.

3. The RNNI of claim 1, wherein the ACTIVE link is monitored using an LIV routine and a PVC polling routine such that the ACTIVE link is changed to INACTIVE if the LIV routine returns a DOWN status and each of the INACTIVE data links are monitored using the LIV routine.

4. The RNNI of claim 3 further comprising notifying a network administrator if one of a first monitoring means and a second monitoring means returns a DOWN status.

5. The RNNI of claim 1, wherein the LIV routine includes Annex A Link Integrity Verification without periodic PVC polling.

6. The RNNI of claim 1, wherein the LIV routine includes Annex D Link Integrity Verification without periodic PVC polling.

7. The RNNI of claim 1, wherein the LIV routine is operative to send an initial sequence number from a first node to a second node over a data link under test thereby resulting in a received sequence number, wherein the sequence number is a binary number, send the received sequence number from the second node back to the first node over the data link under test thereby resulting in a sequence number, determine if the sequence number is the same as the initial sequence number, and increment the sequence number through a predetermined binary sequence to generate a second sequence number, if the sequence number is received correctly.

8. The RNNI of claim 7, further comprising assigning an UP status for the data link under test when a certain number of successful cycles have been completed.

9. A method of initializing a resilient network-to-network interface (RNNI) between a master node in a first frame relay network and a slave node in a second frame relay network, wherein the RNNI comprises a plurality of data links connecting the master and slave nodes, the method comprising the steps of:

operating an independent instance of a Link Integrity Verification (LIV) routine on each of the data links to determine the status of the data links;

detecting which of the data links have received an UP status from the LIV routine;

designating one of the data links with an UP status as ACTIVE and the remaining data links as INACTIVE; and sending a PVC poll status message from the master node to the slave node over the ACTIVE link, wherein the slave node recognizes the ACTIVE link on receipt of the PVC poll status message.

10. The method of claim 9 further comprising the step of monitoring the RNNI, wherein the step of monitoring the RNNI comprises the steps of:

monitoring the ACTIVE link with network-to-network interface (NNI) link management procedures comprising an LIV routine and a PVC polling routine;

changing the state of the ACTIVE link to INACTIVE if the LIV routine of the NNI returns a DOWN status and repeating the steps of operating, detecting, designating, and sending; and monitoring each of the INACTIVE data links with the LIV routine.

11. The method of claim 10 further comprising the step of notifying a network administrator if one of the ACTIVE link monitoring step and the INACTIVE link monitoring step returns a DOWN status.

12. The method of claim 10 further comprising repeating the ACTIVE link monitoring step, the changing step, and the INACTIVE link monitoring step.

13. The method of claim 9, wherein the operating step comprises operating an independent instance of Annex A of ITU-T Recommendation Q.933 without periodic PVC polling on each of the data links to determine the status of each of the data links.

14. The method of claim 9, wherein the operating step comprises operating an independent instance of Annex D from ANSI standard T1.617 without periodic PVC polling on each of the data links to determine the status of the data links.

15. A computer program resident on a computer for operating a resilient network-to-network interface (RNNI) between a first frame relay network and a second frame relay network connected by a plurality of data links, the computer program comprising:

a first program code for causing the computer to operate an independent instance of a Link Integrity Verification (LIV) routine on each of the data links to determine the status of each of the data links;

a second program code for causing the computer to detect which of the data links have received an UP status from the LIV routine;

a third program code for designating one of the data links with the UP status as ACTIVE and the remaining data links as INACTIVE; and a fourth program code for sending a PVC poll status message over the ACTIVE link.

16. The computer program of claim 15 further comprising:

a fifth program code for causing the computer to monitor the ACTIVE link with network-to-network interface (NNI) link management procedures comprising an LIV routine and a PVC polling routine;

a sixth program code for causing the computer to change the state of the ACTIVE link to INACTIVE if the LIV routine of the NNI returns a DOWN status and causing the first program code, the second program code, the third program code, and the fourth program code to be executed again; and a seventh program code for causing the computer to monitor each of the INACTIVE data links with the LIV routine of the NNI.

17. The computer program of claim 16, wherein the computer program logic further comprises an eighth program code for notifying a network administrator if one of the fifth program code and the seventh program code returns a DOWN status.

18. The computer program of claim 15, wherein the LIV routine includes Annex A of ITU-T Recommendation Q.933 without periodic PVC polling.

19. The computer program of claim 15, wherein the LIV routine includes Annex D from ANSI standard T1.617 without periodic PVC polling.

20. A network-to-network interface (NNI) comprising:

a plurality of data links connecting a master node in a first frame relay network to a slave node in a second frame relay network, the plurality of data links comprising:

a monitor for monitoring the status of each of the data links;

a detector for detecting which of the data links have received an UP status from the monitor;

a designator for designating one of the data links with an UP status as ACTIVE and designating the remaining data links as INACTIVE; and a PVC poll status message sent from the master node to the slave node over the ACTIVE link, wherein the slave node recognizes the ACTIVE link on receipt of the PVC poll status message.

21. The NNI of claim 20, wherein the ACTIVE data link and the INACTIVE data links are monitored, and the ACTIVE data link is changed to INACTIVE if the monitor returns a DOWN status for the ACTIVE data link.

22. The NNI of claim 21 further comprising notifying a network administrator if one of the INACTIVE data links returns the DOWN status.

* * * * *